United States Patent
Sakakibara et al.

[11] Patent Number: 6,106,433
[45] Date of Patent: *Aug. 22, 2000

[54] CONTROL SYSTEM OF AUTOMOTIVE AUTOMATIC TRANSMISSION

[75] Inventors: Satoshi Sakakibara, Kanagawa; Kazuhiro Takatori, Yokohama; Tatsuo Wakahara, Kawasaki, all of Japan

[73] Assignee: Nissan Motor Co., Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/146,749

[22] Filed: Sep. 4, 1998

[30] Foreign Application Priority Data

Sep. 4, 1997 [JP] Japan .................................. 9-239530

[51] Int. Cl.7 ........................... F16H 61/00; F16H 61/58; B60K 41/02
[52] U.S. Cl. ............................. 477/118; 477/63; 477/174
[58] Field of Search ...................... 477/174, 175, 477/62, 63, 64, 118

[56] References Cited

U.S. PATENT DOCUMENTS

| | | | |
|---|---|---|---|
| 4,148,231 | 4/1979 | Redzinski | 477/63 |
| 5,146,891 | 9/1992 | Nakazawa | 423/325 |
| 5,161,432 | 11/1992 | Matsumoto et al. | 477/119 |
| 5,553,694 | 9/1996 | Schulz et al. | 477/62 X |
| 5,562,571 | 10/1996 | Maruyama et al. | 477/174 |
| 5,626,535 | 5/1997 | Kono et al. | 477/169 |
| 5,655,996 | 8/1997 | Ohtsuka | 477/175 X |
| 5,787,379 | 7/1998 | Ochiai et al. | 477/63 X |
| 5,807,209 | 9/1998 | Matsubara et al. | 477/62 X |
| 5,816,979 | 10/1998 | Shiiba et al. | 477/174 X |

*Primary Examiner*—Charles A. Marmor
*Assistant Examiner*—Roger Pang
*Attorney, Agent, or Firm*—Foley & Lardner

[57] ABSTRACT

A motor vehicle includes an internal combustion engine and an automatic transmission powered by the engine. The engine has a throttle valve for controlling the amount of air fed thereto. The transmission selectively assumes an Overdrive possible D-range wherein both a lock-up ON condition and a lock-up OFF condition are available and an Overdrive impossible D-range wherein only the lock-up OFF condition is kept. A control system comprises a first section for detecting a first condition of the engine wherein an open degree of the throttle valve is reduced to a certain degree; a second section for detecting a second condition of the transmission wherein the lock-up ON condition of the Over-drive possible D-range is kept; and a third section for engaging a friction element of the transmission to induce an engine brake when the first and second sections detect the first and second conditions respectively.

8 Claims, 5 Drawing Sheets

CONTROL SYSTEM OF AUTOMOTIVE AUTOMATIC TRANSMISSION

BACKGROUND OF THE INVENTION

1. Field of the Invention

The present invention relates in general to control systems of an automotive automatic transmission, and more particularly to the control systems of a type which can engage a friction element to bring about an engine brake when, with the transmission assuming a given forward speed of a so-called Over-drive possible D-range, a throttle opening becomes reduced to a certain small degree due to OFF-operation of an accelerator.

2. Description of the Prior Art

For clarifying the task of the present invention, one known control system of an automotive automatic transmission will be briefly described with reference to FIG. 6 of the accompanying drawings. The transmission of the drawing is described in the manual (A261C07) titled "MAINTENANCE FOR FULL-RANGE .ELECTRONICALLY CONTROLLED AUTOMATIC TRANSMISSION (RE4R01A type)" issued from NISSAN MOTOR CO., LTD in March, 1987.

In the known control system, in a forward drive range with an over-drive switch being ON, engine brake does not operate irrespective of the degree of a throttle opening, while, in a forward drive range with the over-drive switch being OFF, the engine brake operates in the second or third forward speed when the throttle opening becomes small. Either one of these two forward drive ranges is selected at will by manipulating the over-drive switch (OD-SW) which is usually mounted on a shift lever.

For ease of description, the forward drive range with the over-drive switch being ON will be referred to as "Over-drive possible D-range" wherein the transmission can assume a lock-up ON condition, and the forward drive range with the over-drive switch being OFF will be referred to as "Over-drive impossible D-range" wherein the transmission can not assume the lock-up ON condition.

As is described in page I-65 of the manual, in the above-mentioned known control system of the automatic transmission, in case of the Over-drive possible D-range, an overrun clutch (OR/C) 18 (which is a friction element for achieving engine brake) is kept disengaged even when, with the transmission assuming a lock-up ON condition, the driver releases an accelerator or effects an OFF operation of the accelerator.

That is, in the known control system, in the Over-drive possible D-range, the same control map-is used for both a case wherein the lock-up ON condition is established and a case wherein the lock-up ON condition is not established. Accordingly, even when, with the transmission assuming the third forward speed in the Over-drive possible D-range, the throttle opening is reduced to a certain degree due to OFF-operation of the accelerator, the overrun clutch (OR/C) 18 is not engaged. Thus, upon the OFF-operation of the accelerator, a forward one-way clutch (F/OC) 21 is forced to run idle, so that a counter driving force is not transmitted to the engine and thus an engine brake is not applied to the output shaft 12. This phenomenon brings about a sudden drop of the engine speed.

Thus, when, for improving a fuel economy, a fuel cut control has been set to control an associated engine, the control would fail to operate normally. That is, normally, the fuel cut action takes place when, with the engine speed exceeding a predetermined degree, the throttle opening is reduced to a certain level. However, due to dropping of the engine speed, the fuel cut action can not take place even when the throttle opening is reduced.

SUMMARY OF THE INVENTION

It is therefore an object of the present invention to provide a measure which can solve the above-mentioned drawbacks.

It is an object of the present invention to provide a control system by which a friction element of an automatic transmission becomes engaged to bring about an engine brake when, with the transmission assuming a lock-up ON condition in the Over-drive possible D-range, a throttle opening is reduced to a certain small degree due to OFF-operation of an accelerator.

It is another object of the present invention to provide a control system by which a fuel economy of an associated engine, to which a fuel cut control is applied, is improved.

According to a first aspect of the present invention, there is provided a control system which comprises a first section which effects a fuel cut to an engine when a throttle opening is smaller than a given degree and an engine speed is higher than a given degree; and a second section which controls an automatic transmission powered by the engine. The transmission has a lock-up device and is capable of inducing an engine brake by engaging a given friction element installed therein. The second section is capable of providing the transmission with both a first forward driving range wherein the engine brake is induced when the throttle opening is reduced to a certain degree; and a second forward driving range wherein the induction of the engine brake by the reduction of the throttle opening is carried out only when the transmission assumes a lock-up ON condition effected by the lock-up device.

According to a second aspect of the present invention, there is provided a control system used in a motor vehicle. The motor vehicle includes an internal combustion engine and an automatic transmission powered by the engine. The engine has a throttle valve for controlling the amount of air fed thereto, and the transmission selectively assumes an Over-drive possible D-range wherein both a lock-up ON condition and a lock-up OFF condition are available and an Over-drive impossible D-range wherein only the lock-up OFF condition is kept. The control system comprises a first section for detecting a first condition of the engine wherein an open degree of the throttle valve is reduced to a certain degree; a second section for detecting a second condition of the transmission wherein the lock-up ON condition of the Over-drive possible D-range is kept; and a third section for engaging a friction element of the transmission to induce an engine brake when the first and second sections detect the first and second conditions respectively.

DETAILED DESCRIPTION OF THE INVENTION

Figure 1:
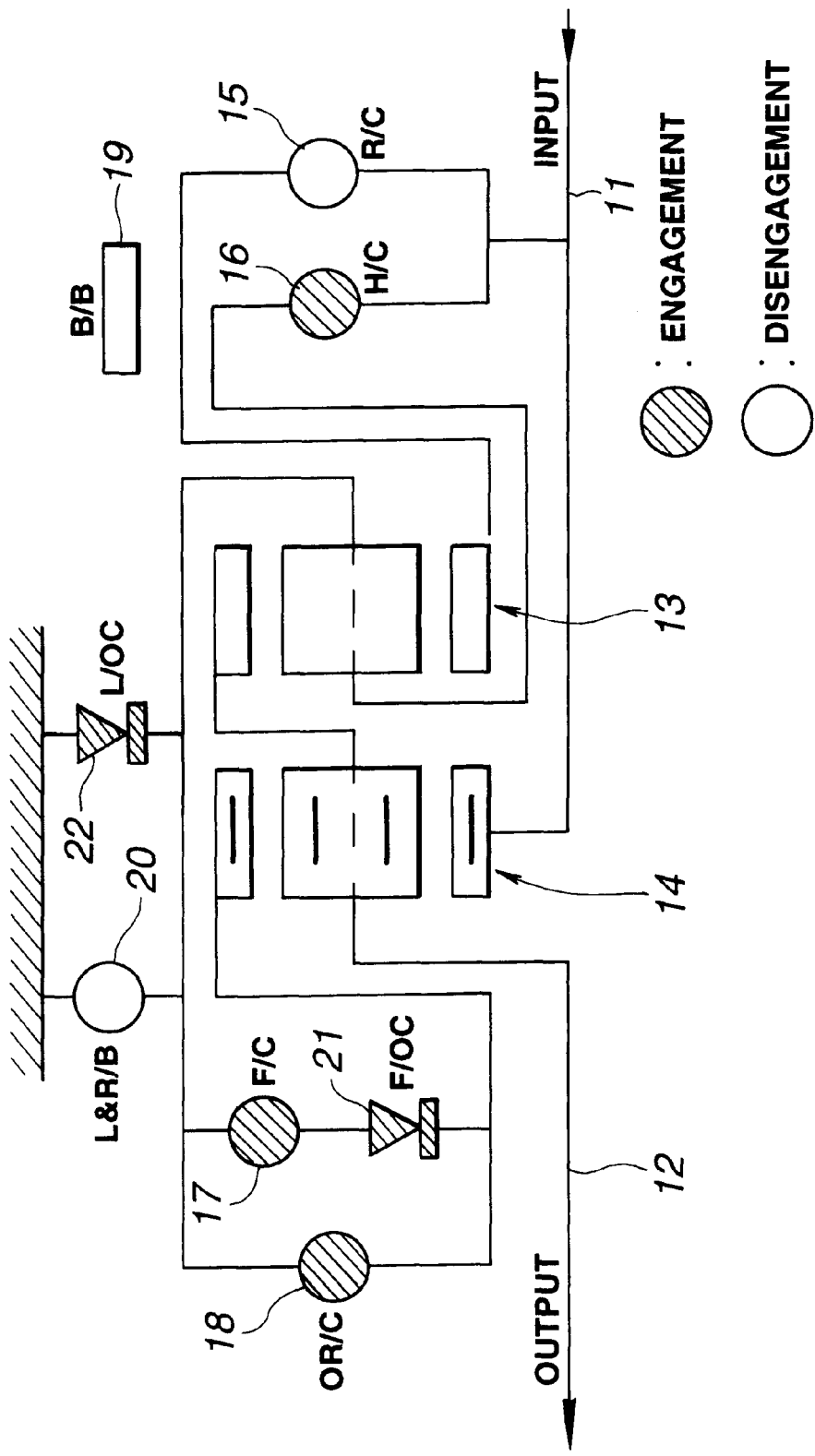
FIG. 1 is a schematic illustration of an automatic transmission to which a control system of the present invention is practically applied.
Figure 4:
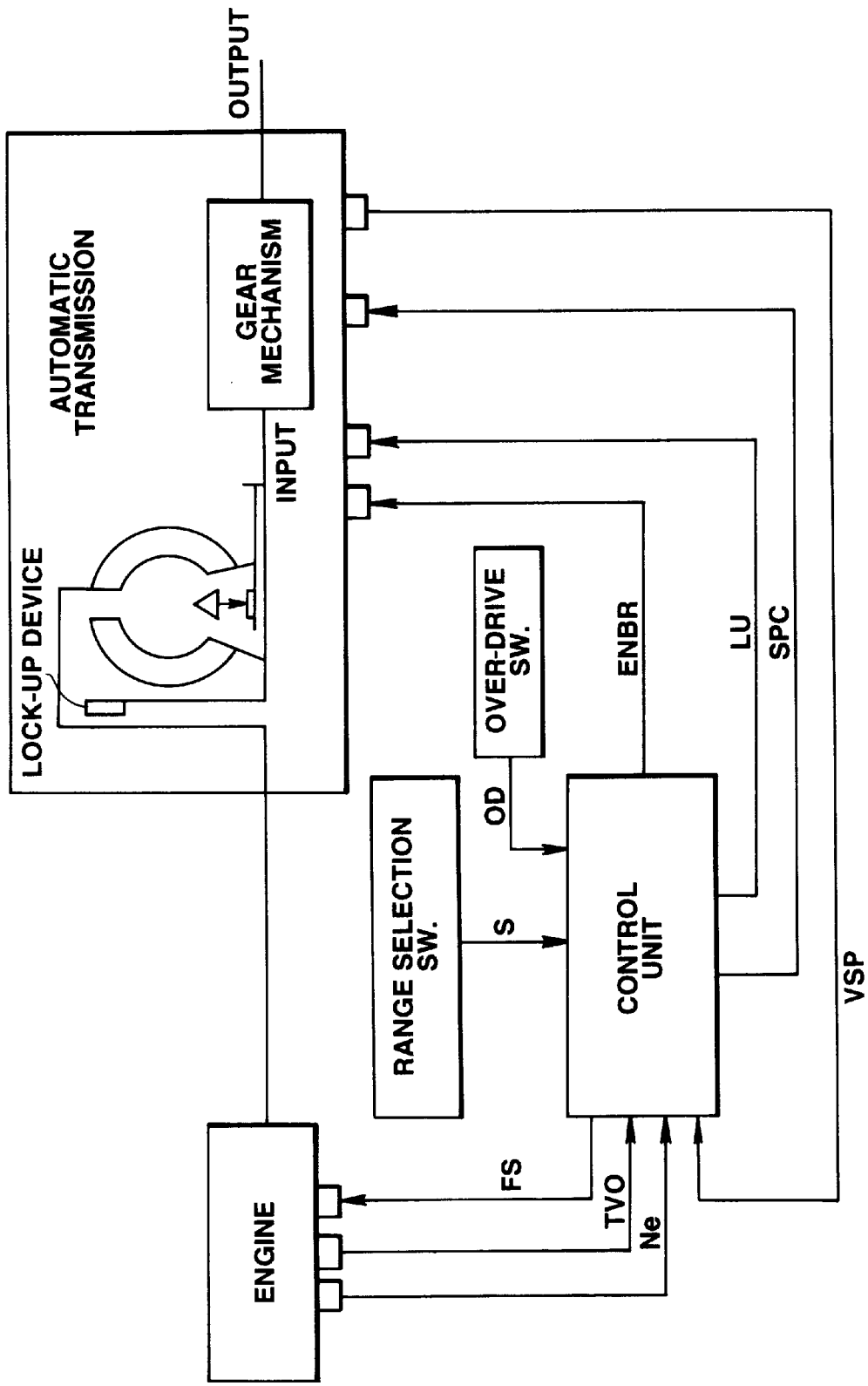
FIG. 4 is a schematic view depicting the concept of the present invention.
Figure 6:
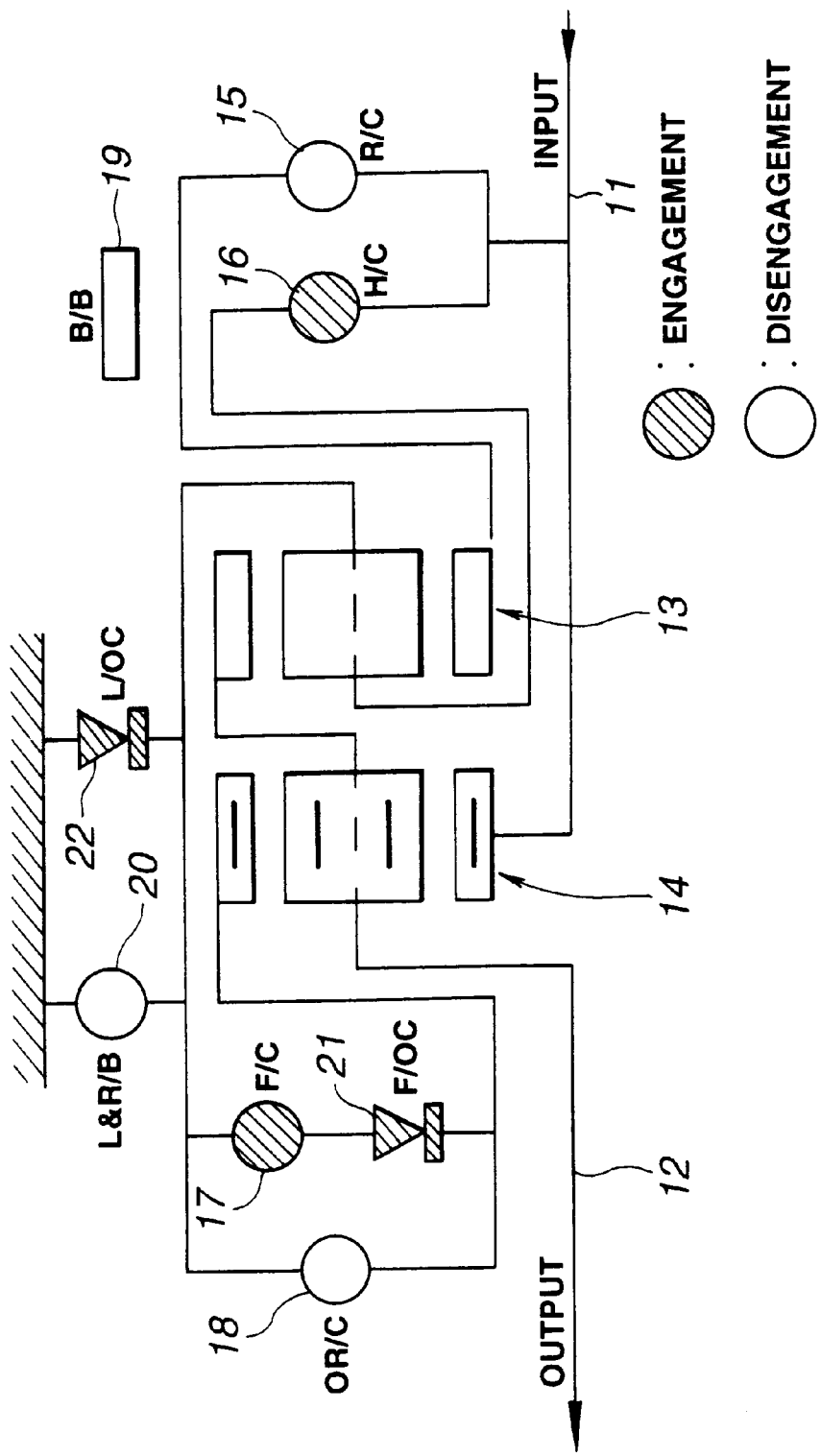
FIG. 6 is a view similar to FIG. 1, but showing an automatic transmission to which the known control system is applied.

Referring to FIGS. 1 and 4, there is schematically shown an automatic transmission to which a control system of the present invention is practically applied.

As shown in FIG. 1, the transmission comprises an input shaft 11 and an output shaft 12 which are coaxially arranged. Between the input and output shafts 11 and 12, there are arranged a front planetary gear unit 13, a rear planetary gear unit 14 and a plurality of friction elements which are a reverse clutch (R/C) 15, a high clutch (H/C) 16, a forward clutch (F/C) 17, an overrun clutch (OR/C) 18, a brake band (B/B) 19, a low-and-reverse brake (L&R/B) 20, a forward one-way clutch (F/OC) 21 and a low one-way clutch (L/OC) 22. That is, the input shaft 11 is connected to the sun gear of the rear planetary gear unit 14, and the output shaft 12 is connected to the pinion carrier of the rear planetary gear unit 14. The pinion carrier of the rear planetary gear unit 14 is connected to the ring gear of the front planetary gear unit 13. The reverse clutch (R/C) 15 is arranged between the sun gear of the front planetary gear unit 13 and the input shaft 11, and the high clutch (H/C) 16 is arranged between the pinion carrier of the front planetary gear unit 13 and the input shaft 11. The forward clutch (F/C) 17 and the forward one-way clutch (F/OC) 21 are connected in series to constitute a series unit (17+21). Between the pinion carrier of the front planetary gear unit 13 and the ring gear of the rear planetary gear unit 14, there are arranged in parallel the overrun clutch (OR/C) 18 and the series unit (17+21). The band brake (B/B) 19 is arranged to brake the sun gear of the front planetary gear unit 13. Between the pinion carrier of the front planetary gear unit 13 and a fixed wall, there are arranged in parallel the low-and-reverse brake (L&R/B) 20 and the low one-way clutch (L/OC) 22.

As is seen from FIG. 4, the input shaft of the transmission (viz., gear mechanism) is connected to a turbine of a torque converter which has a lock-up device installed therein. Thus, the transmission can assume two D-ranges which are an Over-drive possible D-range wherein both a lock-up ON condition and a lock-up OFF condition are available and an Over-drive impossible D-range wherein only the lock-up OFF condition is kept.

For controlling the friction elements of the transmission, a control unit is employed as is seen from FIG. 4. The control unit has a microcomputer which comprises a central processing unit (CPU), a random access memory (RAM), a read only memory (ROM), an input interface and an output interface. By receiving and processing various information signals, the control unit issues to an actuator section of the transmission an engine brake signal "ENBR", a lock-up ON signal "LU" and a speed (or gear) change signal "SPC" and to an air/fuel mixture supply section of the engine a fuel supply signal "FS". The information signals led to the control unit are for example a signal "S" representing a range assumed by the transmission, a signal "OD" representing ON or OFF condition of an over-drive switch, a signal "Ne" representing the rotation speed of the engine, a signal "TVO" representing the open degree of a throttle valve of the engine, a signal "VSP" representing the vehicle speed, etc.,.

A fuel cut control is operatively applied to the air/fuel mixture supply device of the engine, so that when, with the engine speed "Ne" exceeding a predetermined level, the throttle opening "TVO" is reduced to a certain degree, no fuel is supplied to the engine. With this, fuel consumption of the engine is reduced.

Figure 2:
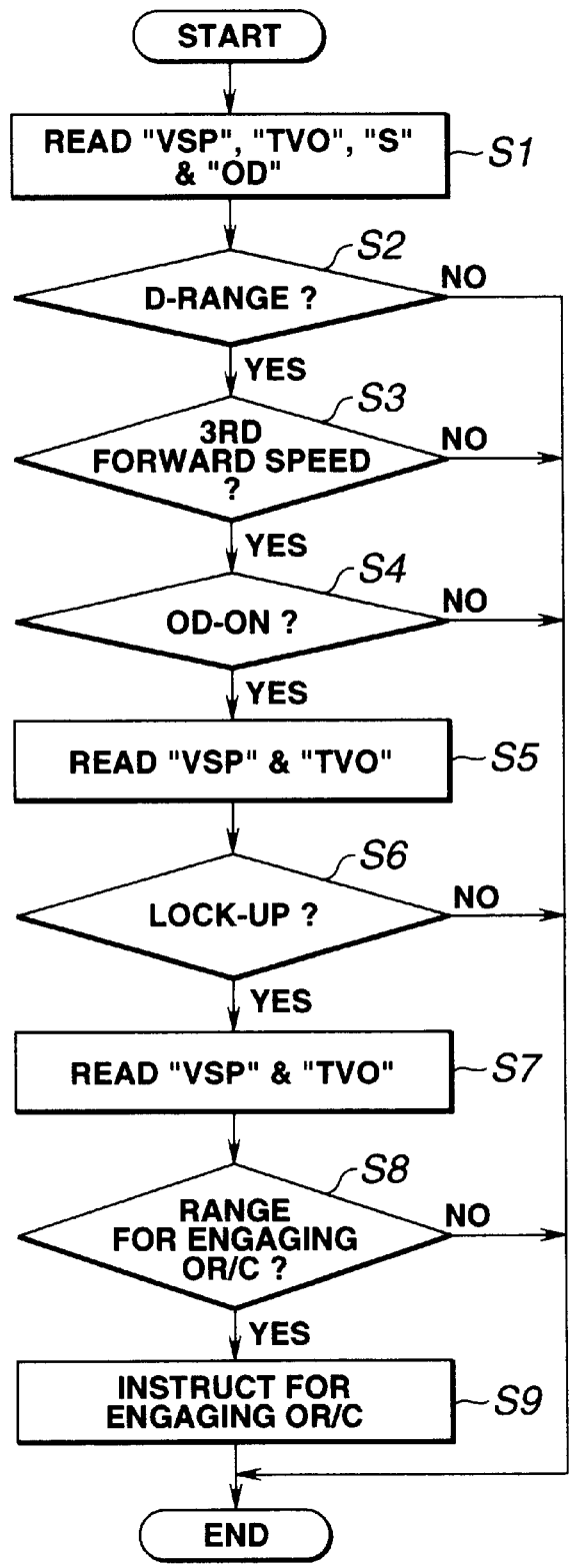
FIG. 2 is a flowchart showing programmed operation steps executed by a control unit employed in the control system of the invention.

In FIG. 2, there is shown a flowchart which depicts programmed operation steps executed by the microcomputer for controlling engagement/disengagement of the overrun clutch (OR/C) 18.

The operation steps shown in FIG. 2 are executed at intervals of a given period. At step S1, various data, such as, the vehicle speed "VSP", the throttle valve open degree "TVO", the range "S" assumed by the transmission and the condition "OD" of over-drive switch are read. The condition of the over-drive switch consists of ON or OFF condition of the same. At step S2, processing these data, judgement is carried out as to whether the transmission assumes either one of the two D-ranges or not. If NO, that is, when the transmission does not assume the Over-drive possible D-range nor the Over-drive impossible D-range, the operation flow goes to END. While, if YES, that is, when the transmission assumes either one of the D-ranges, the operation flow goes to step S3. At this step S3, judgement is carried out as to whether the transmission assumes a third forward speed or not. If NO, the operation flow goes to END. While, if YES, that is, when the transmission assumes the third forward speed in the D-range, the operation flow goes to step S4. At this step S4, judgement is carried out as to whether the over-drive switch is ON or not. If NO, that is, when the over-drive switch is OFF, more specifically, when the transmission is in the third forward speed in the Over-drive impossible D-range, the operation flow goes to END. While, if YES, that is, when the over-drive switch is ON, that is, when the transmission is in the third forward speed in the Over-drive possible D-range, the operation flow goes to step S5. At this step, the vehicle speed "VSP" and the throttle valve open degree "TVO" are read. Then, at step 56, processing these data "VSP" and "TVO", judgment is carried out as to whether the transmission is in a lock-up ON condition or not, that is, whether the torque converter is inoperative or not. If NO, that is, when the transmission is not in the lock-up ON condition, more specifically, when the torque converter operatively works, the operation flow goes to END. In this case, a control map shown by FIG. 5 is selected.

That is, in this case, the transmission assumes a so-called lock-up OFF condition in the Over-drive possible D-range. Under this condition, engine brake is not brought about even when the throttle opening becomes reduced due to OFF operation of the accelerator. For this operation, the control map of FIG. 5 is selected.

As will be described in detail hereinafter, in the present invention, in the Over-drive possible D-range, engine brake is induced only when, with the transmission assuming the lock-up ON condition of the third forward speed, the throttle opening is reduced to a certain small degree due to OFF operation of the accelerator.

Figure 5:
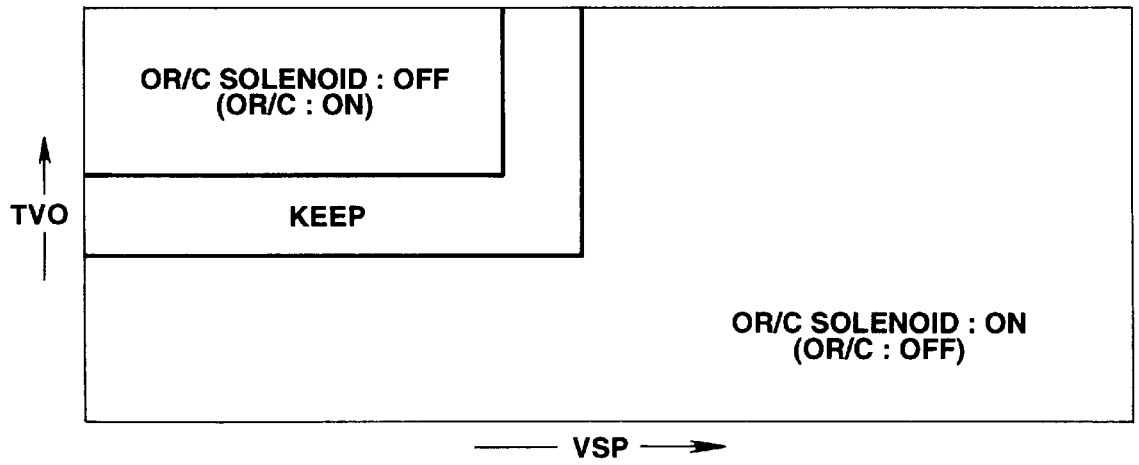
FIG. 5 is a view similar to FIG. 3, but showing a control map used in the above-mentioned known control system.

As is seen from FIG. 5, the control map is provided using the vehicle speed "VSP", and the throttle valve open degree "TVO" as parameters. As is known to those skilled in the art, the throttle valve open degree "TVO" substantially corresponds to a degree by which an accelerator is depressed by a driver. As is seen from the control map, in the region of the "TVO" below a predetermined value, the overrun clutch (OR/C) 19 is determined inoperative (OFF), that is, a solenoid of the overrun clutch (OR/C) 18 is determined ON irrespective of the vehicle speed "VSP".

Figure 3:
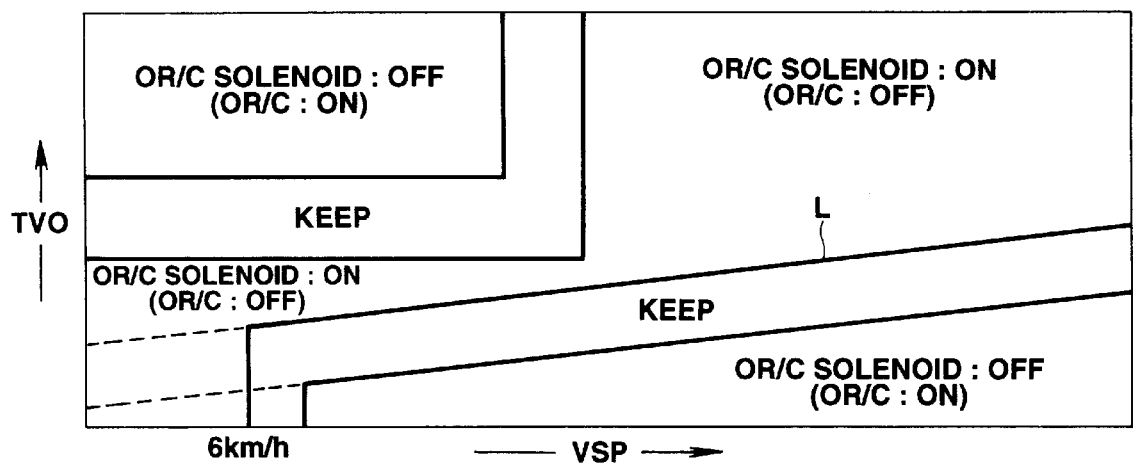
FIG. 3 is a control map used in the control system of the invention.

If YES at step S6, that is, when the transmission is in the lock-up ON condition, more specifically, when the transmission assumes the lock-up ON condition in the third forward speed in the Over-drive possible D-range, the operation flow goes to step S7. At this step, the vehicle speed "VSP" and the throttle valve open degree "TVO" are read. Then, at step S8, processing these data "VSP" and "TVO", judgment is carried out as to whether or not the transmission is in a condition for engaging the overrun clutch (OR/C) 18. For carrying out this judgement, a control map shown by FIG. 3 is used. In fact, this control map is the same as that employed for carrying out engine brake under a condition wherein the transmission assumes the third forward speed in the Over-drive impossible D-range. As is seen from this control map, there is set an engine brake ON-region in a lower part of the map. That is, the engine brake ON-region is set in a lower section of the region of the "TVO" which, in case of the control map of FIG. 5, corresponds to the region in which the overrun clutch (OR/C) 18 is determined inoperative (OFF) (viz., the overrun clutch solenoid is determined ON). More specifically, the engine brake ON-region is defined below an inclined straight line "L". Within the engine brake ON-region, the overrun clutch (OR/C) is determined operative (ON) (viz., the overrun clutch solenoid is determined OFF). Thus, if YES at step S8, that is, when the vehicle speed "VSP" and the throttle valve open degree "TVO" are within the engine brake ON-region, the operation flow goes to step S9. While, if NO, that is, when the vehicle speed "VSP" and the throttle valve open degree "TVO" are not within the ON-region, the operation flow goes to END. At the step S9, an instruction is issued for causing the overrun clutch (OR/C) 18 to be engaged. With this, an engine brake is induced in the Over-drive possible D-range.

As is understood from the above, when, with the transmission assuming a lock-up ON condition of the third forward speed in the Over-drive possible D-range, the throttle opening is reduced to a certain small degree (more specifically, the "TVO" and the "VSP" come into the engine brake ON-range of the control map of FIG. 3), the overrun clutch (OR/C) 18 becomes engaged thereby to induce an engine brake.

In the following, description will be made to a comparison between an operation of the control system of the present invention and that of the above-mentioned known control system.

When, in the known control system, the transmission assumes a lock-up ON condition of the third forward speed in the Over-drive possible D-range, the control map of FIG. 5 is used. It is to be noted that this control map is used also when the transmission assumes a lock-up OFF condition of the third forward speed in the Over-drive possible D-range. Accordingly, even when, with transmission assuming the lock-up ON condition of the third forward speed in the Over-drive possible D-range, the throttle opening is reduced to a certain small degree due to OFF-operation of the accelerator, the overrun clutch (OR/C) 18 is not engaged. Thus, in this case, the forward one-way clutch (F/OC) 21 is forced to run idle, so that a counter driving force is not transmitted to the engine and thus an engine braking is not applied to the output shaft 12. This phenomenon brings about a sudden drop of the engine speed, and thus, when a fuel cut control has been set in the control, the fuel cut action fails to operate normally. That is, due to reduction of the engine speed, fuel cut is not carried out even when the throttle opening shows a small degree.

While, when, in the control system of the present invention, the transmission assumes the lock-up ON condition of the third forward speed in the Over-drive possible D-range, the control map of FIG. 3 is used. It is to be noted that this control map is different from the map of FIG. 5 used when the transmission assumes a lock-up OFF condition of the third forward speed in the Over-drive possible D-range. Accordingly, when, with the transmission assuming the lock-up ON condition of the third forward speed in the Over-drive possible D-range, the throttle opening is reduced to a certain small degree due to OFF-operation of the accelerator, the overrun clutch (OR/C) 18 is engaged. Thus, upon OFF-operation of the accelerator, a counter driving force is transmitted to the engine and thus an engine brake is applied to the output shaft 12. With this, undesired sudden drop of the engine speed is suppressed. Accordingly, when a fuel cut control has been set to improve the fuel economy of the engine, the fuel cut control operates normally even in this engine brake condition. That is, the fuel cut control is operatively carried out also at the time when, with the transmission assuming a lock-up ON condition of the third forward speed in the Over-drive possible D-range, the throttle opening is reduced to a certain small degree. Thus, a fuel economy of the engine is much improved.

It is to be noted that in the present invention, the engine brake in the Over-drive possible D-range is induced only when the transmission assumes a lock-up ON condition wherein the engine exhibits a high fuel economy. Thus, the fuel economy is promoted without sacrificing the driveability of the engine.

In the present invention, in the second or third forward speed of the Over-drive impossible D-range, engine brake is also achieved by engaging the overrun clutch (OR/C) 18. In the Over-drive possible D-range, the engine brake is induced only when, with the transmission keeping the Lock-up ON condition of the third forward speed, the throttle opening is reduced. Usually, the engine brake at the third forward speed affects less shock to passengers on the vehicle.

The contents of Japanese Patent Application 9-239530 filed Sep. 4, 1997 are hereby incorporated by reference.

What is claimed is:

1. A control system comprising:
    a first section for effecting a fuel cut to an engine when a throttle opening of the engine is smaller than a given degree and an engine speed is higher than a given degree; and
    a second section for controlling an automatic transmission powered by said engine, said transmission having therein a lock-up device and an overrun clutch, said lock-up device including a lock-up clutch, said transmission inducing engine brake by engaging said overrun clutch,
    wherein said second section provides the transmission with both:
        a first forward driving range wherein the engine brake is induced when the throttle opening is reduced to a certain degree irrespective of condition of said lock-up clutch; and
        a second forward driving range wherein the induction of the engine brake by the reduction of the throttle opening is carried out only when the transmission assumes a lock-up ON condition effected by said lock-up clutch.

2. A control system as claimed in claim 1, in which said second forward driving range is so set that the engine brake takes place only in a higher one of a plurality of forward speeds.

3. A control system as claimed in claim 2, in which the higher one of the forward speeds is a third forward speed.

4. In a motor vehicle including an internal combustion engine and an automatic transmission powered by the engine, said engine having a throttle valve for controlling the amount of air fed thereto, said transmission selectively assuming an Over-drive possible D-range wherein both a lock-up ON condition and a lock-up OFF condition are available and an Over-drive impossible D-range wherein only the lock-up OFF condition is kept, a control system comprising:
  a first section for detecting a first condition of the engine wherein an open degree of said throttle valve is reduced to a certain degree;
  a second section for detecting a second condition of the transmission wherein the lock-up ON condition of the Over-drive possible D-range is kept;
  a third section for detecting the lock-up OFF condition of the Over-drive impossible range;
  a fourth section for engaging an overrun clutch of the transmission to induce an engine brake when said first and second sections detect the first and second conditions respectively; and
  a fifth section for engaging said overrun clutch of the transmission to induce the engine brake when said first and third sections detect the first and third conditions respectively.

5. A control system as claimed in claim 4, in which said first section further effects a fuel cut to the engine when the open degree of the throttle valve is smaller than a given degree and the rotation speed of the engine is higher than a given degree.

6. A control system as claimed in claim 4, in which the certain open degree of said throttle valve is determined by a control map which shows ON/OFF condition of said overrun clutch with respect to both the open degree of the throttle valve and a running speed of the vehicle.

7. A control system as claimed in claim 4, in which said fourth section effects the engagement of said friction element only when said second section detects a condition wherein the lock-up ON condition of the Over-drive possible D-range is made under a third forward speed.

8. In a motor vehicle including an internal combustion engine and an automatic transmission powered by the engine, said engine having a throttle valve for controlling the amount of air fed thereto, said transmission selectively assuming an Over-drive possible D-range wherein both a lock-up ON condition and a lock-up OFF condition are available and an Over-drive impossible D-range wherein only the lock-up OFF condition is kept, a method of controlling said transmission, comprising the steps of:
  detecting a first condition of the engine wherein an open degree of said throttle valve is reduced to a certain degree;
  detecting a second condition of the transmission wherein the lock-up ON condition of the Over-drive possible D-range is kept; and
  engaging a overrun clutch of the transmission to induce an engine brake when said first and second conditions are detected.

* * * * *